United States Patent [19]
Goertzen

[11] Patent Number: 5,522,734
[45] Date of Patent: Jun. 4, 1996

[54] APPARATUS FOR INTERCONNECTING WHEELCHAIR BATTERIES

[75] Inventor: Gerold G. Goertzen, Brunswick, Ohio

[73] Assignee: Invacare Corporation, Elyria, Ohio

[21] Appl. No.: 228,118

[22] Filed: Apr. 15, 1994

[51] Int. Cl.⁶ .................................................. H01R 3/00
[52] U.S. Cl. ........................ 439/500; 180/68.5; 439/388
[58] Field of Search ................................... 439/500, 384, 439/388; 180/68.5, 65.1, 907; 429/97–100

[56] References Cited

U.S. PATENT DOCUMENTS

| | | |
|---|---|---|
| 2,978,053 | 4/1961 | Schmidt . |
| 3,708,028 | 1/1973 | Hafer . |
| 4,216,839 | 8/1980 | Gould et al. . |
| 4,317,497 | 3/1982 | Alt et al. . |
| 4,967,864 | 11/1990 | Boyer et al. . |
| 5,092,774 | 3/1992 | Milan ................................. 439/378 |
| 5,125,849 | 6/1992 | Briggs et al. ...................... 439/378 |
| 5,156,226 | 10/1992 | Boyer et al. . |
| 5,197,559 | 3/1993 | Garin, III et al. . |

FOREIGN PATENT DOCUMENTS

WO92/04200  3/1992  WIPO .

*Primary Examiner*—David L. Pirlot
*Attorney, Agent, or Firm*—Fay, Sharpe, Beall, Fagan, Minnich & McKee

[57] ABSTRACT

An apparatus for interconnecting wheelchair batteries having a pair of boxes with flanges extending from side walls thereof, and a wheelchair sub-frame assembly which provides concise placement of the boxes in an electrically interconnected suspended position. The sub-frame assembly has an open end into which the boxes are inserted, a pair of spaced apart parallel guide rails each having a smooth surface for slidably receiving and supporting the boxes by their flanges, and a closed end having a cross-brace rigidly connected therebetween. A first pair of mateable electrical connectors are connected to the first and second boxes, respectively and conduct current between batteries thereof. A second pair of mateable electrical connectors are connected to the first box and the cross-brace and conduct electricity between the battery of the first box and the electric motor.

19 Claims, 5 Drawing Sheets

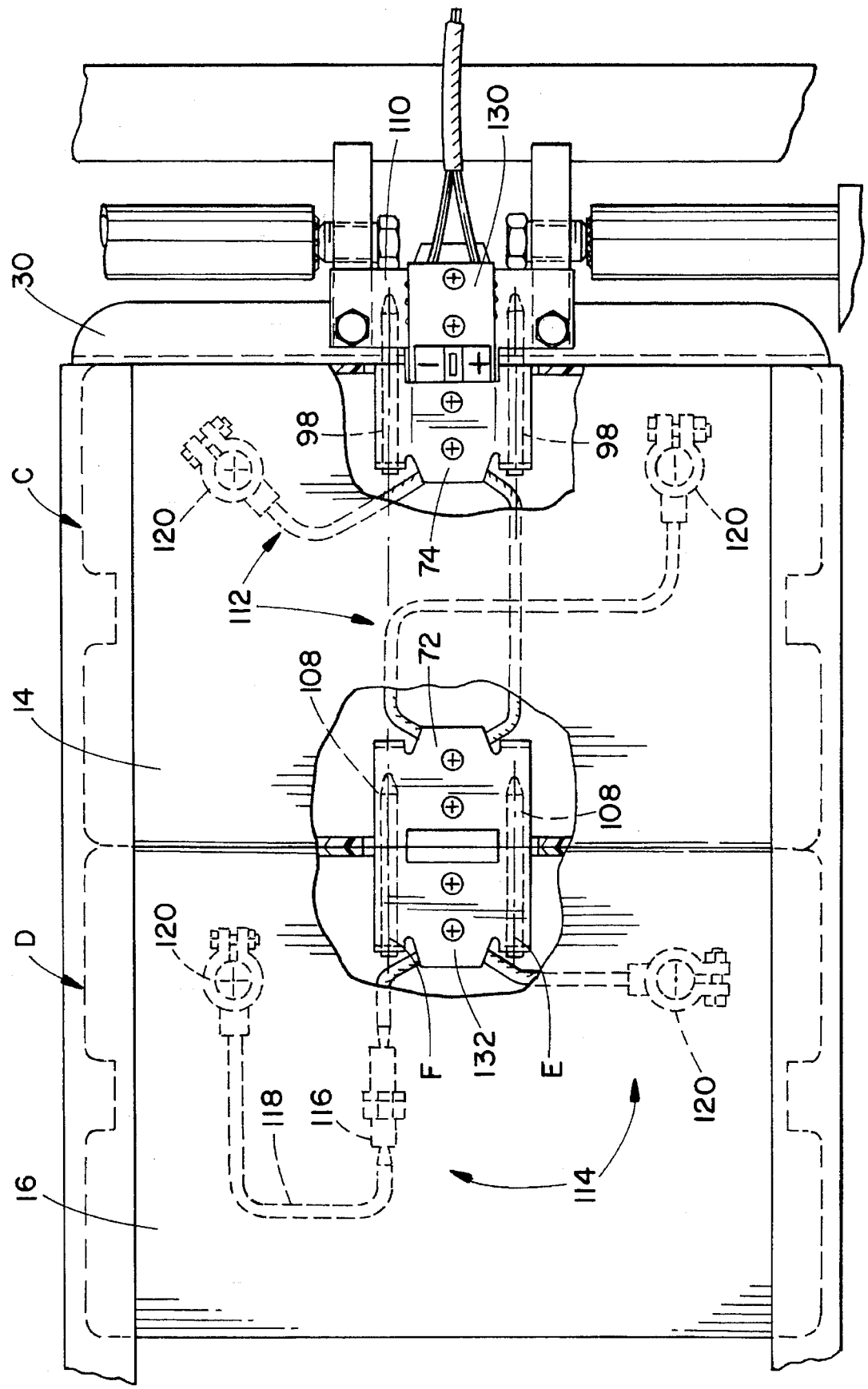

APPARATUS FOR INTERCONNECTING WHEELCHAIR BATTERIES

BACKGROUND OF THE INVENTION

This invention relates generally to electric wheelchairs. More particularly, the present invention is directed to an improved apparatus for interconnecting wheelchair batteries with a wheelchair electric motor.

The present invention is specifically directed to a flanged box and a frame assembly for housing and supporting a battery or a plurality of batteries in an electrically powered vehicle such that they may be easily placed into the flanged boxes, and the boxes may be easily placed into and pushed along the frame assembly to facilitate precise, electrical interconnective placement of the batteries.

Electric wheelchairs are typically powered by heavy batteries. Typically, these batteries are placed in a tray positioned underneath the seat of the wheelchair and are electrically interconnected to the wheelchair motor using a series of cables. Wheelchairs are designed to be compact and lightweight. Such compact design, however, provides only a restricted space in which wheelchair batteries are housed. Battery installation and electrical interconnection requires placement of the batteries within the restricted housing area followed by connecting the battery terminals to the electric motor terminals of the electric motor via the electric cables. To this end, tools are required to secure the respective ends of the electric cables to the terminals of the batteries and to the electric motor. However, due to the restricted battery housing space, the tools necessary for connecting the electrical cable ends to the battery terminals and the electric motor terminals cannot be properly manipulated.

It is known to expand the space into which the batteries are housed to facilitate easier connection of the batteries to the electric motor. However, adding extra space to the battery housing area is contrary to electric wheelchair design goals of creating a compact unit.

It is also known to use removable trays for installing and supporting wheelchair batteries within a wheelchair frame. However, removable battery trays are expensive to manufacture and must be formed of sturdy material to support the batteries which can weigh over fifty pounds each. Moreover, the support trays increase the overall weight of the wheelchair. In addition to these problems, the great weight of the wheelchair batteries creates a further disadvantage. Prior to installation, a plurality of batteries, is placed upon the removable battery tray, the aggregate wight of which can be over one hundred pounds. Thereafter, the tray and batteries must be lifted and manufactured into proper orientation within the wheelchair assembly. The prohibitive weight of the tray and battery combination makes installation thereof into a restricted space a laborious task requiring great strength.

Accordingly, it has been considered desirable to develop a new and improved apparatus for supporting and interconnecting wheelchair batteries which would overcome the foregoing difficulties and others while providing better and more advantageous overall results.

BRIEF SUMMARY OF THE INVENTION

According to one aspect of the invention, an apparatus is provided for interconnecting one or more wheelchair batteries with an electric wheelchair motor. The apparatus comprises one or more boxes for housing the batteries, each box having a base, side walls, end walls, a removable cover and at least one flange securely connected to each side wall. A frame assembly effects a precise placement of the boxes in an electrically interconnected, suspended position. The frame assembly has an open end into which the boxes are sequentially inserted, a pair of spaced-apart, parallel guide rails each having a flat surface for slidably receiving and supporting the boxes by their flanges, and a closed end having a cross-brace rigidly connected between the guide rails. A first pair of mateable electrical connectors is provided for conducting current between the wheelchair battery of the first box and the wheelchair battery of the second box, wherein the first pair of mateable electrical connectors is secured to the first and second boxes, respectively. Also provided is a second pair of mateable electrical connectors for conducting current between the wheelchair battery of the first box and the electric motor wherein the second pair of mateable electrical connectors is secured to the first box and the cross-brace, respectively.

Preferably, the mateable electrical connectors are pushed together to mate without using tools. The mateable electrical connectors are provided with at least one mating terminal through which current is conducted, each mating terminal including a sliding surface and a mating surface formed at an obtuse angle with respect to one another. Each mating terminal is formed such that when the sliding surface of the first mating terminal is pushed into contact with the sliding surface of the second, conversely positioned mating terminal, the sliding surface of the first mating terminal slides upwardly and over the sliding surface of the second mating terminal until the mating surface of the first mating terminal slides downwardly into contact with the complementary mating surface of the second mating terminal.

To ensure that the mateable electrical connectors are properly aligned prior to being mated, the present invention provides a first pair of alignment pins and a first pair of alignment sockets for aligning the first pair of mateable electrical connectors into mating engagement. The first pair of alignment pins is attached to either the first or second boxes and extends along first and second axes wherein the first and second axes are parallel to the guide rails when the boxes are inserted thereon. The corresponding first pair of sockets is attached to either the first or second boxes in alignment with the first and second axes. A second pair of alignment pins and a second pair of alignment sockets is also provided for aligning the second pair of mateable electrical connectors into mating engagement. This second pair of alignment pins is attached to either the first box or the cross-brace and extends along the first and second axes, respectively. The second corresponding pair of sockets is attached to either the first box or the cross-brace and is also in alignment with the first and second axes, respectively.

One advantage of the present invention is the provision of a new and improved apparatus for interconnecting wheelchair batteries with an electric wheelchair motor.

Another advantage of the present invention is the provision of an apparatus for interconnecting wheelchair batteries with an electric wheelchair motor which provides a toolless and speedy method by which the batteries can be installed and automatically aligned and interconnected in a relatively confined space in the wheelchair assembly.

Still another advantage of the present invention is the provision a lightweight but rigid system for the support and alignment of wheelchair batteries in an electric wheelchair which facilitates ready access to the batteries for unrestrained removal and/or replacement thereof.

Yet another advantage of the present invention is the provision of a prewired wheelchair battery system in which the person installing the batteries in the wheelchair does not have to manually make any electrical connections between the one or more batteries and the motor or motors of the wheelchair. Rather, all such connections are made automatically when the one or more battery boxes are slid onto a battery support have and abutted against each other with the first battery box being abutted against a connector mounted on the battery support frame of the wheelchair.

A further advantage of the present invention is the provision of an apparatus for interconnecting wheelchair batteries with an electric wheelchair motor wherein separate wiring harnesses are provided within each box for connecting the terminals of the battery in each box to at least one mateable electrical connector attached to the same box.

Still other advantages and benefits of the present invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 3A is a top plan view of the assembly of FIG. 1 having a partial cut-away showing the interconnections between the boxes and cross-brace;

DETAILED DESCRIPTION OF THE PREFERRED EMBODIMENT

Figure 1:
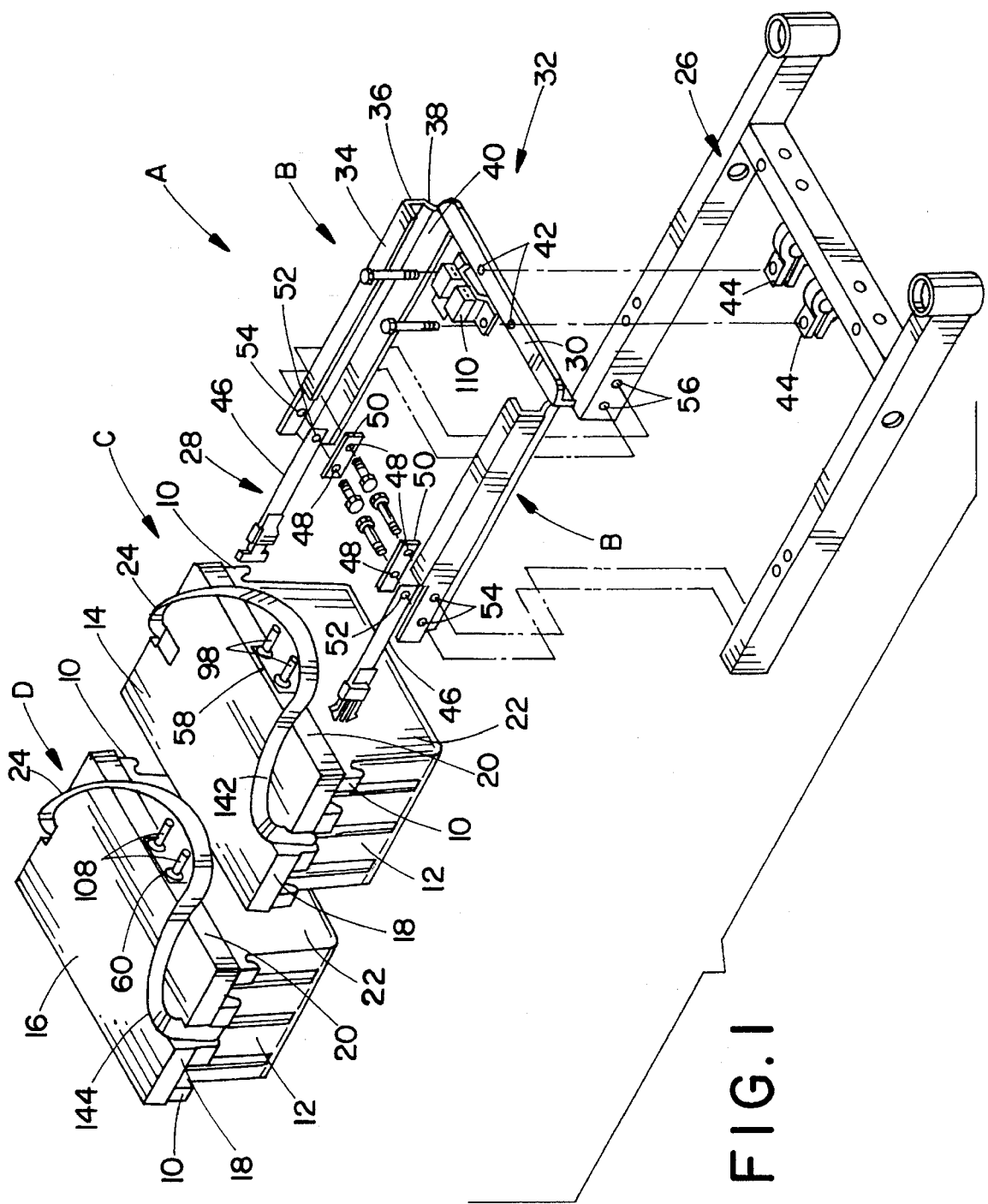
FIG. 1 is an exploded perspective view of interconnectable boxes and a battery sub-frame assembly together with a wheelchair main frame according to the preferred embodiment of the present invention.

Referring now to the drawings wherein the showings are for the purposes of illustrating a preferred embodiment of the invention only and not for the purposes of limiting same, FIG. 1 shows a wheelchair sub-frame assembly A having a pair of guide rails B which are adapted to receive first and second boxes C, D which house electric batteries. While the present invention is described as being useful with an electric wheelchair, it is evident that this system could also be adapted for use with other types of electric vehicles.

With continuing reference to FIG. 1, each box includes generally L-shaped flanges 10 integrally formed on sidewalls 12 of the boxes and extending outwardly and downwardly. Removable covers 14, 16 include side and edge flaps 18, 20 adapted to engage side and end walls 12, 22 of the boxes when the removable covers are in operative engagement with the boxes. Carrying straps 24 each have a pair of ends securely connected to respective side walls of the boxes. The carrying straps 24 facilitate rapid and efficient insertion of the battery boxes into the sub-frame assembly A.

Figure 4:
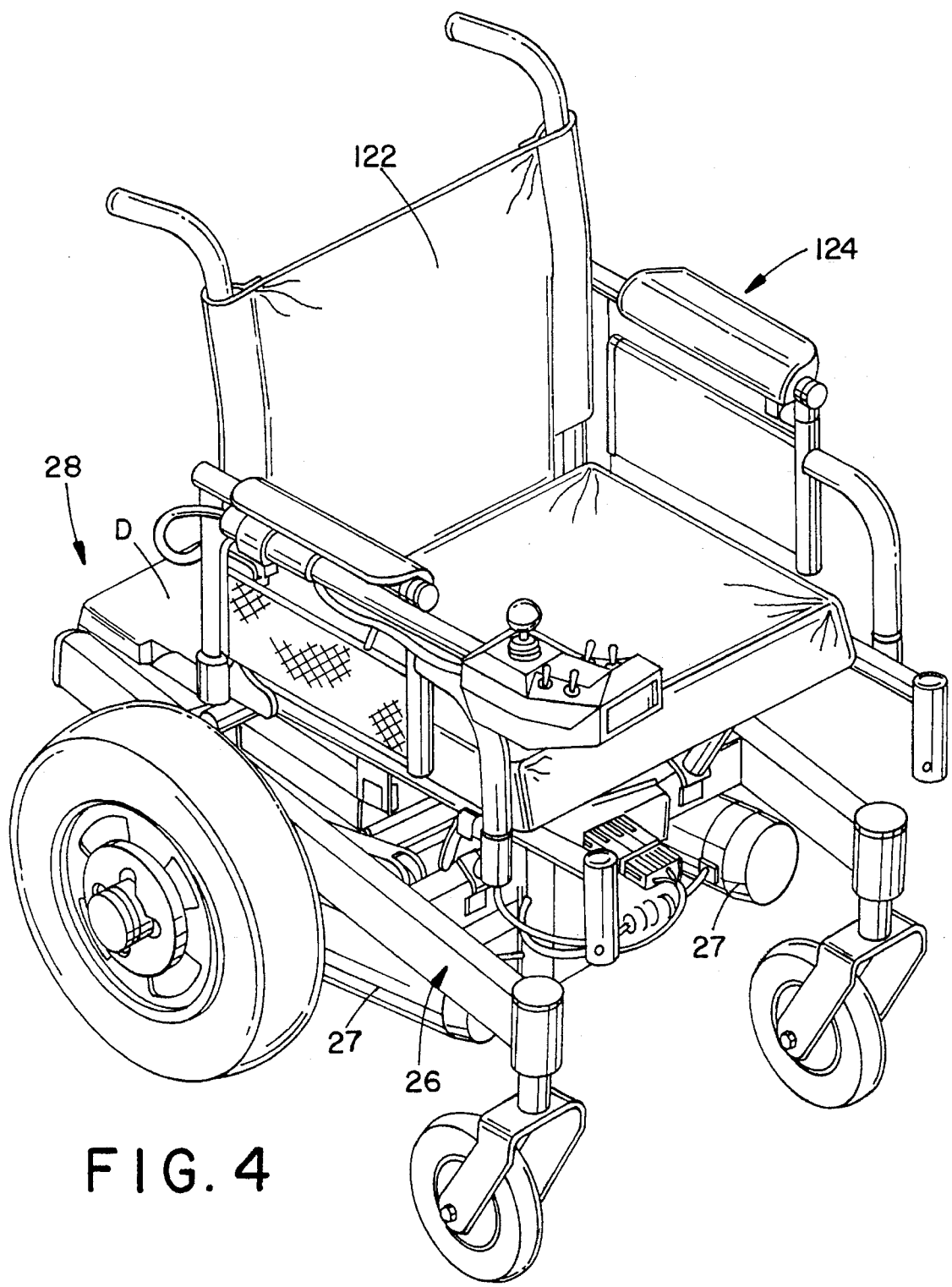
FIG. 4 is a perspective view of a wheelchair incorporating the preferred embodiment of the present invention.

Sub-frame A is adapted to be fastened to a main frame 26. The sub-frame supports the battery containing boxes C and D and provides for a concise placement of the batteries in operative engagement therebetween and in operative engagement with at least one motor for the wheelchair. In the embodiment of FIG. 4, two such wheelchair motors 27 are shown. The sub-frame A is comprised of an open end 28, a pair of parallel guide rails B having a generally channel shape, and a cross-brace 30 which is rigidly attached between the guide rails to form a closed end 32 of the sub-frame. The open end 28 of the sub-frame is adapted to sequentially receive the first and second boxes C, D as they are inserted within the guide rails for slidable placement within the sub-frame. The guide rails B are generally channel shaped each having an upper rim 34, a side wall 36, and a narrow, integrally formed extension 38 from which extends a lower rim 40. Each lower rim 40 has a smooth elongated surface to allow for slidable movement of the box flanges 10 as said boxes C, D are moved along the guide rails B. The sub-frame guide rails B are fixed onto the cross-brace 30 in parallel arrangement, and are spaced apart from one another so as to closely retain the boxes within the sub-frame. In particular, the perpendicular distance separating opposing midpoints of the lower rims 40 is substantially similar to the perpendicular distance between opposing flanges 10 of each box.

The cross-brace 30 is rigidly connected between the pair of parallel guide rails, opposite the open end 28 of the sub-frame, and supports the parallel, spaced apart arrangement of the guide rails B. The cross-brace 30 forms the closed end of the sub-frame so that as the boxes are pushed into and along the guide rails, the boxes cannot be pushed past the cross-brace and are retained within the sub-frame. Fasteners extend through apertures 42 defined in the cross-brace, and aligned main frame extension apertures 44 to secure the closed end of the sub-frame assembly to the main frame assembly 26.

A pair of retaining straps 46 are attached to the open end 28 of the sub-frame and restrain the boxes from moving out of electrically interconnected suspended position. Each restraining strap is connected to the sub-frame using a fastener adapted to extend through aperture 48 defined in a retaining bracket, an aperture 52 defined in each restraining strap and an aperture 54 defined in the side wall of the guide rail. Moreover, a fastener is adapted to extend through each main frame aperture 56 defined in the main frame 26 thereby securing the opened end 28 of the sub-frame assembly to the main frame.

Figure 2:
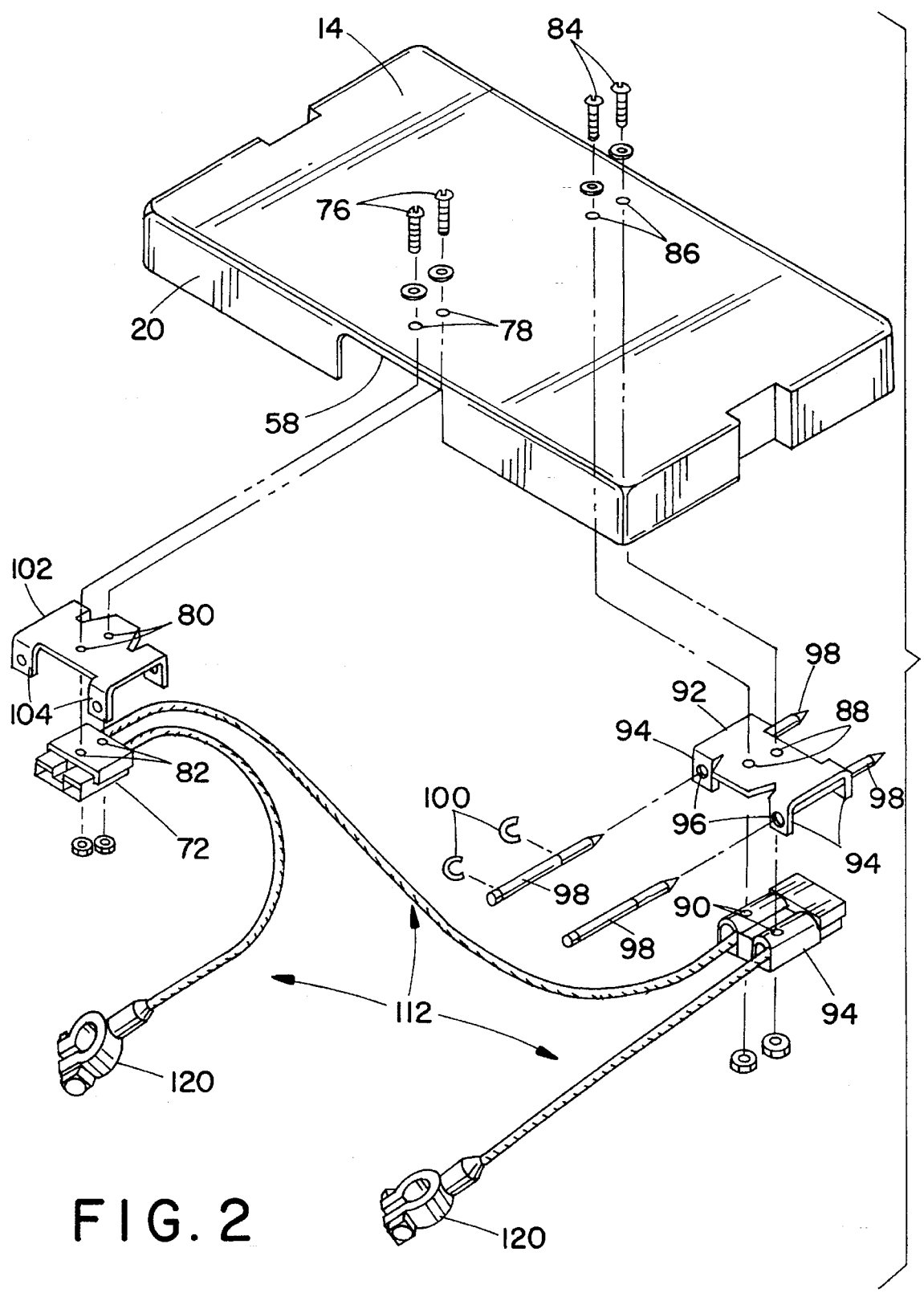
FIG. 2 is an enlarged exploded perspective view of the first box interconnections and a wiring harness of the assembly of FIG. 1.
Figure 3B:
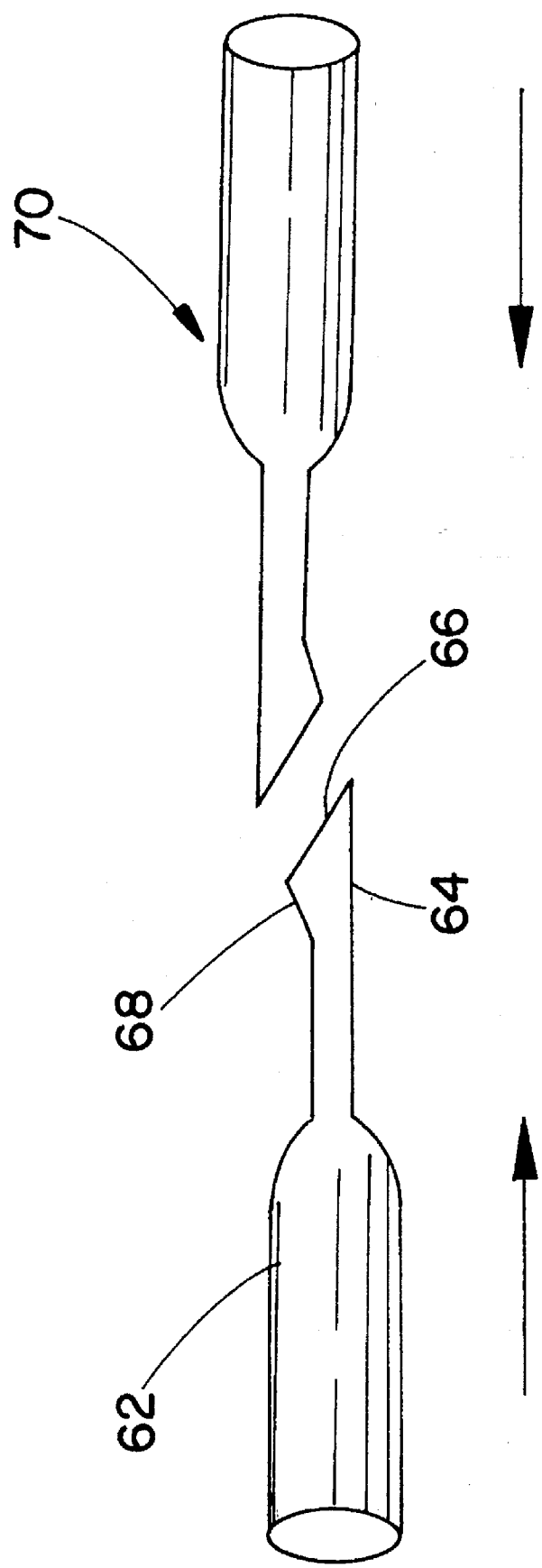
FIG. 3B is a greatly enlarged side elevational view of adjacent terminal conductors of separate mateable electrical connectors.

With continuing reference to FIG. 1 and with additional reference to FIG. 2, the first box cover 14 includes a recessed portion 58 defined in each end flap. Moreover, a recessed portion is defined in each end wall 22 of the first box and positioned to align with the corresponding recessed portion 58. Furthermore, the second box cover 16 includes a recessed portion 60 defined in the end flap facing the closed end 32 which aligns with a recessed portion defined in the end wall of box D facing the closed end 32. With the first and second boxes suspended from the guide rails, all recessed portions of the box covers and boxes are positioned in linear alignment to facilitate electrical interconnection between the batteries and an electric motor as will be more fully described below.

with continuing reference to FIG. 2 and with further reference to FIGS. 3A and 3B mateable electrical connectors are provided to conduct electricity between the batteries housed in the first and second boxes and the at least one electric motor of the wheelchair. Each mateable electrical connector includes a pair of conductors each having a terminal 62 for electrical connection to a corresponding battery, and a flexible mating terminal 64. Each mating terminal includes a wedge-shaped sliding surface 66 and a mating surface 68 formed at an obtuse angle with respect to one another. Each mating terminal is formed so that, when mating with a conversely positioned mating terminal 70, the sliding surface of the first mating terminal is pushed into contact with the sliding surface of the second conversely positioned mating terminal, the sliding surface of the first mating terminal slides upwardly and over the sliding surface of the second mating terminal until the mating surface of the first mating terminal slides downwardly into contact with the mating surface of the second mating terminal.

Mating between a pair of mateable electrical connectors occurs by applying oppositely, inwardly directed forces to each mating electrical connector, respectively. Conversely, the mating electrical connectors are detached by applying oppositely directed outward forces to the mating electrical connectors respectively. Such mateable electrical connectors are known and are manufactured by Anderson Power Products of Boston, Mass.

A first pair of mateable electrical connectors are attached to one end of the first box cover and an adjacent end of the second box cover. A second pair of mateable electrical connectors are secured to the other end of the first box cover and the cross-brace of the sub-frame assembly. With reference to FIG. 2, one mateable electrical connector from each of the first and second pairs of mateable conductors is shown. In particular, mateable electrical connector 72 of the first pair of mateable electrical connectors is shown oriented upside down in relation to mateable electrical connector 74 of the second pair of mateable electrical connectors. Fasteners 76 extend through apertures 78 defined in the first cover box, apertures 80 defined in a socket bracket, and apertures 82 defined in the mateable electrical connector 72 to secure the mateable electrical connector and the socket bracket to the box cover. Similarly, a pair of fasteners 84 are adapted to extend through apertures 86 defined in the box cover, apertures 88 defined in an alignment pin bracket and apertures 90 defined in the mateable electrical connector 74 to attach the mateable electrical connector 74 and an alignment pin bracket 92 to the first box cover 14.

The alignment pin bracket 92 includes four tabs 94 defining apertures 96 into which a first pair of alignment pins 98 are secured therein by a pair of retaining rings 100. Similarly, a socket bracket 102 includes a pair of sockets 104 adapted for slidably receiving a corresponding pair of alignment pins 108 (see FIG. 3A) attached to the second box D.

With reference to FIGS. 1 and 3A, the first pair of alignment pins 98 are attached to the first box cover and extend therefrom along axes E and F, respectively. Similarly, a second pair of alignment pins 108 are attached to the second box cover and extend therefrom along the axes E and F, respectively. Each alignment pin includes an elongated cylindrical portion having a smooth outer surface. In this arrangement, the first pair of alignment pins 98 is received in a first pair of alignment sockets 110 attached to the cross-brace, and the second pair of alignment pins 108 are received in the second pair of alignment sockets 104 attached to the first box cover 16 as described above. Prior to the mateable electrical connectors being mated, the alignment pins and alignment sockets operate to precisely position the mateable electrical connectors thereby facilitating mating thereof.

With reference to FIGS. 2 and 3A, the wheelchair batteries are electrically connected to the mateable electrical connectors via first and second wiring harnesses 112 and 114. Each wiring harness include cables for electrically connecting wheelchair batteries to mateable electrical connectors. In the preferred embodiment, the wiring harnesses are arranged to effect a series electrical connection between the wheelchair batteries. An in-line fuse 116 is located within a cable 118 of the second wiring harness to limit the flow of current to the wheelchair electric motor. Wiring harness terminals 120 provide electrical contact between the cables and batteries.

With reference to FIG. 4, the first and second boxes are suspended from the guide rails of the sub-frame assembly, the combination of which is positioned beneath and behind a seat 122 of the wheelchair 124. The sub-frame assembly open end 28 extends behind the seat 122 to facilitate insertion of the boxes therein. After the first box is inserted into the sub-frame assembly, the box is moved linearly along the guide rails until the first pair of mateable electrical connectors mate. Prior to mating, the second pair of alignment pins and second pair of alignment sockets position the second pair of mateable electrical connectors to facilitate mating thereof. Thereafter, the second box D is inserted into the sub-frame assembly and moved linearly along the guide rails until the first pair of mateable electrical connectors are mated. To this end, the first pair of alignment pins and alignment sockets place the second pair of mateable electrical connectors in alignment to facilitate mating thereof. Since the wheelchair batteries are connected to the first and second pair of mated electrical connectors, via the first and second wiring harnesses, a circuit is created for conducting current between the wheelchair electric batteries connected in series and the wheelchair battery motor. With this arrangement, the present invention facilitates easy removal and interconnecting placement, and secures containment and support of batteries in electrically powered vehicles.

The structure disclosed herein is advantageous in that it allows the person installing the battery container boxes C and D to readily and automatically align and electrically connect the batteries held within the battery container boxes C and D with the motors 27. This is accomplished when the first battery container box C is pushed flush against a connector 130 mounted on the cross-brace of front rail 30 of the battery support sub-frame A. Proper alignment of the battery box C is provided by the alignment pins 98 as they extend into the alignment sockets 110. Thereafter, the second battery box D can be pushed on the rails of the battery support sub-frame A until it contacts the first battery box C. When this is done, the pair of batteries are aligned due to the extension of the alignment pins 108 into the alignment sockets 104. Simultaneously, the mateable electrical connector 72 is contacted by an electrical connector 132 secured to the cover 16 of the second battery box D. The batteries can be secured on the rail by use of the straps 146 illustrated in FIG. 1.

Removal of the batteries can also be easily accomplished by use of the straps 140 and 142 secured to the battery boxes C and D as illustrated in FIG. 1. By pulling the second battery container box D backwards via strap 144 and away from the first battery container box C, it can be slid off the battery support sub-frame A and lifted away from the wheelchair. Thereafter the first battery container box C and be slid away from the cross-brace 30 and off the sub-frame A by use of the strap 142.

It should be appreciated that while two separate battery container boxes C and D are illustrated in FIG. 1 of the drawings with each box holding a battery, both batteries could be housed within a single battery container box if that is desired. Obviously if only a single battery box is employed then a single set of aligning pins and brackets would be necessary on the box and a single pair of mateable electrical connectors would be secured on the box. These would mate with suitable electrical connectors on the battery support sub-frame crossrail with the alignment pins extending into a bracket held on the crossrail.

The batteries employed for the wheelchair are conventional and of the type commonly used with wheelchairs. It is noted that the alignment pins are not connected to the batteries so that the batteries will not discharge if the pins contact a metal object.

It should be appreciated that the provision of a single fuse 116 in the second battery box D is enough to disable the electrical circuit formed between the pair of battery boxes and the motors 27 of the wheelchair due to the fact that the positive terminal of the battery located in the second battery box 16 is connected to the negative terminal of the first battery box 14. Thus if the second battery box is missing, the first battery box will not complete a circuit with the electric motor. The second battery box is necessary in order to complete the circuit. When both batteries are installed, if there is any kind of electrical problem, the fuse 116 will trip in the second battery box thereby disabling the entire circuit.

The invention has been described with reference to a preferred embodiment. Obviously, modifications and alterations will occur to others upon the reading and understanding of the specification. It is intended to include all such modifications and alterations insofar as they come within the scope of the appended claims or the equivalents thereof.

Having thus described the invention, it is now claimed:

1. An apparatus for interconnecting at least one battery with an electric motor, comprising:

at least one box for housing the one battery, the box having a base, side walls, end walls, a removable lid and at least one flange securely connected to each side wall;

a frame assembly effecting a precise placement of the box in an electrically interconnected suspended position, said frame assembly having an open end into which the box is inserted, a pair of spaced-apart parallel guide rails each having a smooth surface slidably receiving and supporting the box by its flanges, and a closed end having a cross-brace rigidly connected between the guide rails;

a pair of detachably mated electrical connectors for conducting current between the one battery and the electric motor, the first detachably mated electrical connector being fastened to the box and being electrically connected to the one battery, and the second detachably mated electrical connector being located on said frame assembly and being electrically connected to the motor, each detachably mated electrical connector including at least one mating terminal, each mating terminal including a sliding surface and a mating surface formed at an obtuse angle with respect to one another, each mating terminal formed such that when the sliding surface of a first mating terminal is pushed into contact with the sliding surface of a second, conversely positioned mating terminal, the sliding surface of the first mating terminal slides upwardly and over the sliding surface of the second mating terminal until the mating surface of the first mating terminal slides downwardly into contact with the mating surface of the second mating terminal such that the mating surfaces are closely engaged.

2. The apparatus of claim 1 further comprising an alignment pin mated with an alignment socket for precisely aligning the pair of detachably mated electrical connectors, one of the alignment pin and alignment socket being attached to the box.

3. The apparatus of claim 2 wherein the alignment pin includes an elongated shaft positioned parallel to the parallel guide rails.

4. The apparatus of claim 3 wherein the alignment pin shaft has a smooth outer surface to facilitate sliding movement with the alignment socket.

5. An apparatus for interconnecting at least two batteries with an electric motor, comprising:

at least two boxes for housing batteries, each box having a base, side walls, end walls, a removable cover and at least one flange securely connected to each side wall;

a frame assembly for effecting a precise placement of the boxes in an electrically interconnected suspended position, said sub-frame assembly having an open end into which the boxes are inserted, a pair of spaced-apart parallel guide rails each having a smooth surface for slidably receiving and supporting the boxes by their flanges, and a closed end having a cross-brace rigidly connected between the guide rails;

a first pair of mateable electrical connectors for conducting current between a battery of the first box and a battery of the second box, the first pair of mateable electrical connectors being secured to the first and second boxes, respectively;

a second pair of mateable electrical connectors for conducting current between the battery of the first box and the electric motor, the second pair of mateable electrical connectors being secured to the first box and the cross-brace, respectively;

a first alignment pin and socket for concisely aligning the first pair of mateable electrical connectors prior to the first pair of mateable electrical connectors being mated, the first alignment pin being secured to one of the first and second boxes, and the first socket being secured to the other of the first and second boxes; and a second alignment pin and socket for concisely aligning the second pair of mateable electrical connectors prior to the second pair of mateable electrical connectors being mated, the second alignment pin being secured to one of the first box and the cross-brace, and the second socket being connected to the other of the first box and cross-brace.

6. The apparatus of claim 5 further comprising a first alignment pin bracket for attaching the first alignment pin to one of the first and second boxes, a first socket bracket for attaching the first socket to the other of the first and second boxes, a second alignment pin bracket for attaching the second alignment pin to one of the first box and the cross-brace, and a second socket bracket for attaching the second socket bracket to the other of the first box and the cross-brace.

7. The apparatus of claim 5 wherein each mateable electrical connector includes at least one mating terminal through which current is conducted, each mating terminal including a sliding surface and a mating surface formed at an obtuse angle with respect to one another, each mating terminal formed such that when the sliding surface of a first mating terminal is pushed into contact with the sliding surface of a second, conversely positioned mating terminal, the sliding surface of the first mating terminal slides upwardly and over the sliding surface of the second mating terminal until the mating surface of the first mating terminal slides downwardly into contact with the mating surface of the second mating terminal such that the mating surfaces are closely engaged.

8. The apparatus of claim 5 wherein each box cover comprises side and end flaps which engage corresponding side and end walls of the box, respectively, the first box cover having a recessed portion defined in each end flap through which extends one mateable electrical connector of the first pair of mateable electrical connectors and the second pair of mateable electrical connectors, and the second box cover having a recessed portion defined in one of the end flaps through which extends one mateable electrical connector of the first pair of mateable electrical connectors.

9. The apparatus of claim 5 further comprising a first wiring harness contained within the first box for electrically connecting the first box battery to one of the first pair of mateable electrical connectors and to one of the second pair of mateable electrical connectors, and a second wiring harness contained in the second box for electrically connecting second box battery to one of the second pair of mateable connectors.

10. An apparatus for interconnecting at least two wheelchair batteries with a wheelchair electric motor, the apparatus comprising:

two boxes each housing at least one wheelchair battery, respectively, each box having a rectangular base, side walls having inner and outer surfaces, end walls having inner and outer surfaces, a removable cover, and at least one flange extending from each side wall outer surface;

a wheelchair sub-frame assembly for effecting a precise placement of the boxes in an electrically interconnected suspended position so that one of the first box outer end wall surfaces is parallel with one of the second box outer end wall surfaces, said wheelchair sub-frame assembly having an open end into which the boxes are sequentially inserted, a pair of spaced-apart parallel guide rails each having a flat surface for slidably receiving and supporting the boxes by their flanges, and a closed end having a cross-brace rigidly connected between the parallel guide rails;

a first pair of mateable electrical connectors for conducting current between the wheelchair batteries of first and second boxes, the first pair of electrical connectors being attached to the first and second boxes, respectively;

a second pair of mateable electrical connectors for conducting current between the wheelchair battery of the first box and an electric wheelchair motor, the second pair of electrical connectors being attached to the first box and the cross-brace, respectively;

a first pair of alignment pins and a first pair of alignment sockets for aligning the first pair of mateable electrical connectors into mating engagement, the first pair of alignment pins being attached to one of the first and second boxes and extending along first and second axes, respectively, and the first pair of sockets attached to the other of the first and second boxes in alignment with the first and second axes, respectively, the first pair of alignment sockets being adapted to receive the first pair of alignment pins; and a second pair of alignment pins and a second pair of alignment sockets for aligning the second pair of mateable electrical connectors into mating engagement, the second pair of alignment pins being attached to one of the first box and the cross-brace and extending along the first and second axes, respectively, and the second pair of sockets attached to the other of the first box and the cross-brace in alignment with the first and second axes, respectively, the alignment sockets being adapted to receive the second pair of alignment pins.

11. The apparatus of claim 10 wherein each mateable electrical connector includes at least one mating terminal through which current is conducted, each mating terminal including a sliding surface and a mating surface formed at an obtuse angle with respect to one another, each mating terminal formed such that when the sliding surface of a first mating terminal is pushed into contact with the sliding surface of a second, conversely positioned mating terminal, the sliding surface of the first mating terminal slides upwardly and over the sliding surface of the second mating terminal until the mating surface of the first mating terminal slides downwardly into contact with the complementary mating surface of the second mating terminal such that the mating surfaces are closely engaged.

12. The apparatus of claim 10 wherein the sub-frame assembly is fastened to a wheelchair mainframe assembly.

13. The apparatus of claim 10 wherein each box cover comprises side and end flaps which engage corresponding side and end wall outer surfaces of the box, respectively, the first box cover having a recessed portion defined in each end flap, the box further including a recessed portion defined in each end wall, the second box cover having a recessed portion defined in one of the end flaps, the second box further including a recessed portion defined in a corresponding end wall, wherein the recessed portions of each box and box cover are positioned to align with the first and second axes.

14. The apparatus of claim 10 wherein the first pair of alignment pins are attached to one of the first and second box covers, the first pair of alignment pins are attached to the other of the first and second box covers, and one of the second pairs of alignment pins and second pairs of alignment sockets are attached to the first box cover.

15. The apparatus of claim 14 wherein the first pair of mateable electrical connectors are attached to the first and second box covers, respectively, and one of the second pair of mateable electrical connectors is attached to the first box cover, said first and second pairs of mateable electrical connectors arranged in linear alignment between the first and second axes.

16. The apparatus of claim 10 further comprising a first wiring harness for electrically connecting the first wheelchair battery of the first box to one of the first pair of mateable electrical connectors and to one of the second pair of mateable electrical connectors, and a second wiring harness for electrically connecting the second wheelchair battery of the second box to one of the second pair of mateable connectors.

17. The apparatus of claim 16 wherein the wheelchair batteries are electrically connected in series.

18. The apparatus of claim 17 further comprising an in-line fuse electrically connected to the second wiring harness, for limiting current flow between the wheelchair batteries and the wheelchair electric motor.

19. An apparatus for conducting current between at least one battery and an electric motor, comprising:

at least one box for housing the one battery, the box having a base, sidewalls, endwalls, and at least one flange securely connected to each sidewall;

a frame effecting a precise placement of the box in a suspended position, said frame assembly having an open end into which the box is inserted, and a pair of spaced guide rails receiving and supporting the box by its flanges;

first and second detachably mated electrical connectors for conducting electric current between the at least one battery and the electric motor, the first detachably mated electrical connector being fastened to the box, each detachably mated electrical connector including a mating terminal, each mating terminal including a sliding surface and a mating surface formed at an obtuse angle with respect to one another, each mating terminal formed such that when the sliding surface of a first mating terminal engages the sliding surface of a second, conversely positioned mating terminal, the sliding surface of the first mating terminal slides over the sliding surface of the second mating terminal until the mating surface of the first mating terminal engages the mating surface of the second mating terminal.

* * * * *

UNITED STATES PATENT AND TRADEMARK OFFICE
CERTIFICATE OF CORRECTION

PATENT NO. : 5,522,734
DATED : June 4, 1996
INVENTOR(S) : Gerold G. Goertzen

It is certified that error appears in the above-indentified patent and that said Letters Patent is hereby corrected as shown below:

In Claim 14, line 3, by deleting "pins" and inserting

--sockets--.

Signed and Sealed this

Twenty-third Day of June, 1998

Attest:

BRUCE LEHMAN

*Attesting Officer*  *Commissioner of Patents and Trademarks*